(12) United States Patent
Königer et al.

(10) Patent No.: US 7,062,961 B2
(45) Date of Patent: Jun. 20, 2006

(54) SYSTEM FOR ACQUIRING MEASURED VALUES REPRESENTING THE STATE OF A MATERIAL DURING PRODUCTION, PROCESSING OR FINISHING OF THE MATERIAL

(75) Inventors: Johann Königer, Augsburg (DE); Werner Scherer, Dinkelscherben (DE); Andreas Birkenfeld, Dinkelscherben (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 5 days.

(21) Appl. No.: 10/726,926

(22) Filed: Dec. 3, 2003

(65) Prior Publication Data

US 2004/0134285 A1 Jul. 15, 2004

(30) Foreign Application Priority Data

Dec. 3, 2002 (DE) ................................ 102 56 312

(51) Int. Cl.
*G01L 5/04* (2006.01)
(52) U.S. Cl. ....................................................... 73/159
(58) Field of Classification Search .................. 73/789, 73/866.1, 159, 826; 700/122
See application file for complete search history.

(56) References Cited

U.S. PATENT DOCUMENTS 5,947,024 A * 9/1999 Birkenfeld .................. 101/219
6,209,401 B1 * 4/2001 Backlund ..................... 73/829

FOREIGN PATENT DOCUMENTS

| DE | 44 08 898 | 8/1999 |
| DE | 196 01 358 | 1/2000 |
| DE | 199 55 120 | 5/2001 |
| EP | 1 020 813 | 7/2000 |

* cited by examiner

*Primary Examiner*—Max Noori
(74) *Attorney, Agent, or Firm*—Cohen, Pontani, Lieberman & Pavane

(57) ABSTRACT

A state information system for acquiring measured values of chemical and/or physical variables during the production, processing or finishing of a material, in particular in the case of a printing material web in a web-fed press, includes at least one sensor for recording the chemical and/or physical variables, the state information system being provided on or in the material such that the operating process carried out with the material remains unaffected by it.

17 Claims, 3 Drawing Sheets ously been used in the present invention would be apparent from

SYSTEM FOR ACQUIRING MEASURED VALUES REPRESENTING THE STATE OF A MATERIAL DURING PRODUCTION, PROCESSING OR FINISHING OF THE MATERIAL

BACKGROUND OF THE INVENTION

1. Field of the Invention

The invention relates to a state information system for acquiring measured values during the production, processing or finishing of a material, in particular in the case of a printing material web in a web-fed press, including at least one sensor for recording chemical and/or physical variables.

2. Description of the Related Art

During the production, processing or finishing of material, such as metal, film or paper, for example a printing material web in a press, it is generally known to record the state of the material at stationary measurement points within the machine. From the physical and/or chemical variables determined as a result, it is possible for conclusions to be drawn about the influence of the finishing unit located upstream of the respective measured value sensor.

Furthermore, it is generally known in flat plastic cards to provide memory chips on which information is stored such that it can be read out. Smart cards of this type can be put into a wallet and are produced for use as credit cards, identification cards and so on.

DE 196 01 358 C2 discloses a paper with an integrated circuit. It is proposed to embed extremely thin integrated circuits—what are known as circuits which can be interrogated without contact, which are also known under the names of identifying circuit board or transponder—in the mass of the paper. The paper produced in this way may be treated by printing and encrypted programming can be performed on the circuit. In the simplest case, chips are provided which contain predetermined data, such as production number, date of production or other specific information and can only be read out. For applications in which it is desired to programme in personal code numbers, bidirectional chips are provided which, in addition to the ability to be read out, also permit programming.

SUMMARY OF THE INVENTION

It is an object of the invention to provide an apparatus with which physical and/or chemical states of a material can be recorded continuously during its entire production, processing or finishing process.

According to the invention, this object is achieved by a measured value acquisition system provided on or in the web.

By means of the measured value acquisition system, provided on a material web, physical and/or chemical variables can advantageously be measured continuously during the production, processing and/or finishing process. In this case, advantageous differentiated measurement over the processing width is possible.

The measured data recorded can be stored by the measured value acquisition system and read outside the process.

Furthermore, an embodiment is also possible in which, during the measurement, the data can be transmitted to one or more receiver stations outside the plant. These measured values can advantageously be incorporated in a control loop of the machine. Via the relationship between the time axis, the known web speed and the known processing paths from one to another point of influence within the machine, it is possible to calculate at what point in the system an influence is exerted on the material. In order to influence the process positively, a control intervention can then be made at the appropriate point in the plant.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

The significant core of the present invention is to integrate measured value sensors in a material and then, as a rule during the production, processing and/or finishing, to be able to measure a changing physical and/or chemical state of the material continually. For this purpose, in an exemplary basic embodiment, a sensor and an integrated circuit and a power system are used to create a state information system which, because of the extremely small dimensions of the individual constituent parts, can be applied in or to the material without substantial influence on the finishing processes. The state information system, together with the material, passes through the entire production, processing and/or finishing process and can seamlessly record any influence which is exerted on the material. The material can be, for example, metal, film or paper, in particular a printing material web, which is processed in a web-fed press.

The state information system can be introduced into the material as early as during the production, being surrounded completely or only partly by the material as required. Furthermore, it is also possible to arrange the state information system on its own carrier and to bond it adhesively with the carrier to the surface of the material.

By using the relationship between the time axis, the known finishing speed and the paths passed through within predefined sections of a finishing plant, it is possible to determine exactly at what position within the machine or by which finishing unit what influence is exerted on the material.

For the purpose of evaluation, the state information system can specifically be separated out downstream of the finishing process, and the measured values can be read out from an internal memory.

Furthermore, it is also possible, within the integrated circuit of the state information system, to provide a transmitter which passes on the information recorded directly to a receiver outside the plant. The measured values transmitted in this way can be incorporated on-line in a control loop belonging to the machine or plant.

Figure 1:
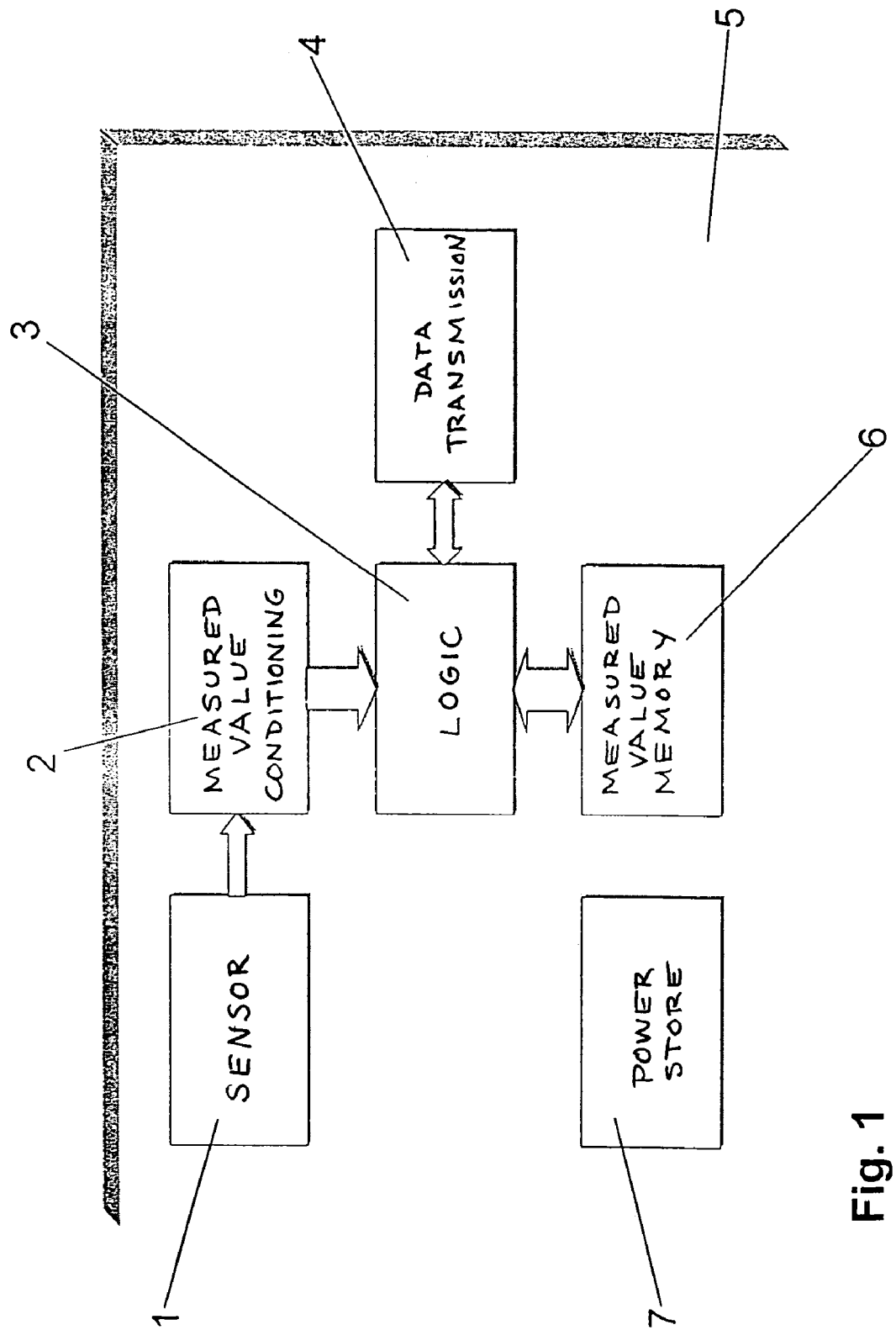
FIG. 1 shows a first embodiment according to the invention of a state information system, FIGS. 2a, b, c represent a printing material web which is provided with state information systems according to the invention.

FIG. 1 shows an exemplary embodiment of a state information system according to the invention which is embedded in the mass of the paper of a printing material web 5. In this case, a sensor 1 is connected to a measured value conditioning means 2 and a logic unit 3. The measured value conditioning means 2 contains an electric circuit which derives a physical or chemical variable from the sensor signal. The logic unit 3 controls and/or regulates the measuring sequence. For example, it is possible to convert the sensor signals continuously or only cyclically, for example to record a measured value only at a time interval of a few milliseconds. Alternatively, the measured data can be transmitted by the logic unit 3 via a data transmission means 4 to an external receiver or can be stored in a measured value memory 6 within the state information system.

To supply power to the state information system, a power store 7 is provided. This may be a battery which is permanently integrated in the system and can be activated as appropriate before measurement use. As a result, self-discharge can be prevented. The battery can be provided in a gel design or in printed form. Furthermore, it is also conceivable to provide a capacitor within the state information system. This can be charged externally, for example via surface contacts. For specific uses, it may be sufficient to charge the capacitor once, and it holds sufficient power for the entire measurement operation. However, charging without contact via inductive coupling, microwaves, etc. can also be provided. Charging without contact can, if appropriate, also be carried out on the run.

Conceivable as a sensor 1 are, for example, temperature sensors, stress/strain sensors, moisture sensors or pH sensors for measuring the acidity level.

The data transmission means 4 can transmit the data optionally in parallel with the measurement or separated in space and time from the measurement. This can be carried out inductively via the transponder principle, with contact by means of surface contacts (smart-card principle) or via radio methods or via microwaves—familiar to those skilled in the art.

Figure 2A:
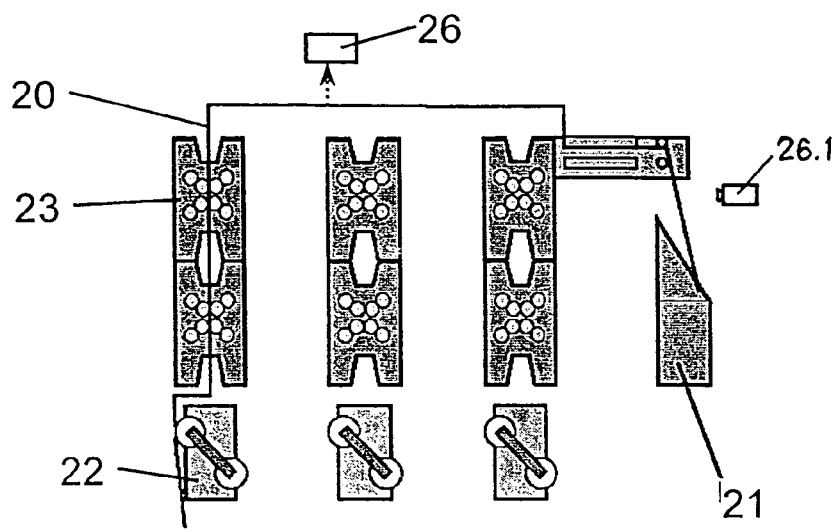
Figure 2B:
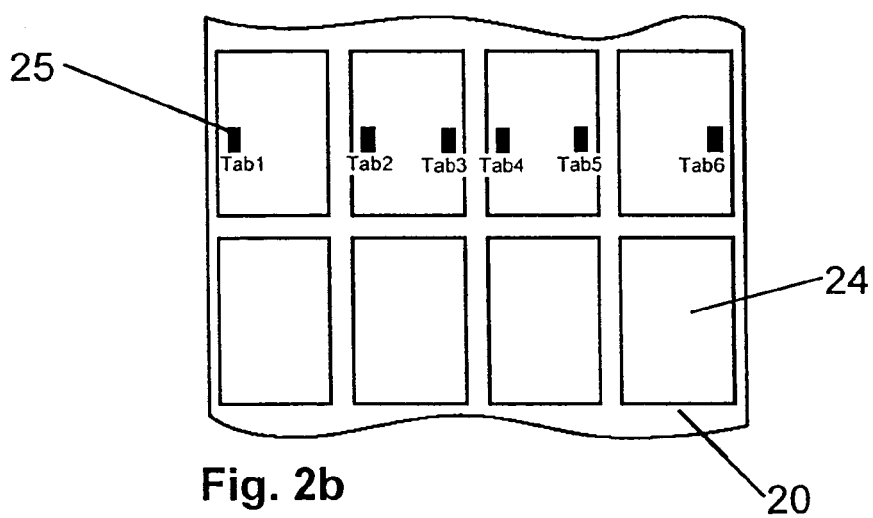

FIG. 2a shows a printing material web 20 which is led through printing units 23 of a web-fed press and, on a reel changer 22, is provided with adhesive labels 25 which each contain a state information system according to the invention. FIG. 2b illustrates the width of the printing material web with the arrangement of printed pages 24. The arrow indicates the direction of movement of the printing material web 20 within the press. In this example, six labels 25 are provided over the width of the printing material web 20 and, after passing through the press, can specifically be removed with the printed product at a folder 21 (FIG. 2a).

The labels 25 are numbered consecutively with Tab 1, 2 . . . 6 and, by using appropriate encoding or on the basis of the printed image, conclusions can be drawn about their position on the printing material web 20. After the memory of the state information system has been read out, the measured values can be evaluated and displayed graphically according to FIG. 2c.

Figure 2C:
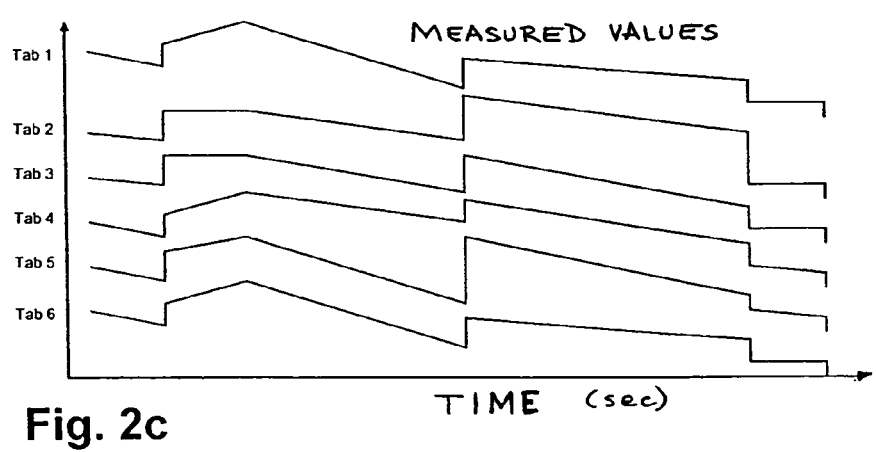

FIG. 2c illustrates the recorded state change of the individual tabs Tab 1 . . . 6 over the time axis. Via the relationship between the time, web speed and the knowledge of the distances between the individual printing points, the measured values displayed can be assigned unambiguously to the corresponding finishing units (printing points).

If use is made of state information systems which pass on the measured values continuously to receivers 26 outside the printing material web, the measured values can be incorporated on-line in a control loop belonging to the press. Deviations from predefined desired values can be corrected via appropriate open-loop/closed-loop control mechanisms.

According to a further embodiment according to the invention, the state information system can also be designed without the measured value processing, logic unit, memory or data transmission and power store. In this case, sensors can be provided which record the chemical and/or physical variables in a remanent manner. These can be, for example, temperature sensors which are provided with colored elements which change color permanently at specific temperatures. Furthermore, strain elements are possible which are deformed plastically under tensile loading, for example form a contraction, and the tensile stress can be determined from the extent of the deformation. Using sensors of this type, after a printing material web has passed through a press, the minimum or maximum values of the respective physical or chemical variable can be determined.

Figure 3:
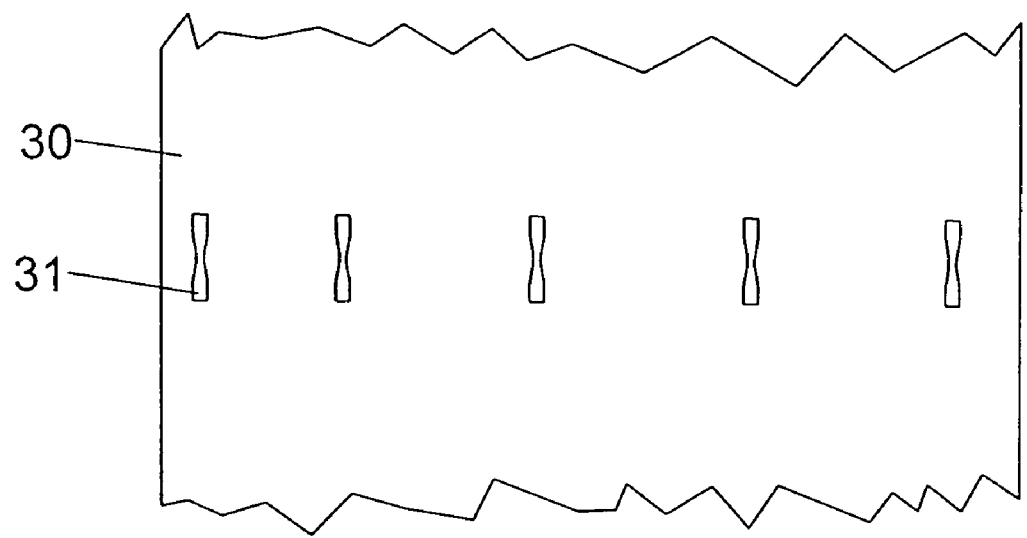
FIG. 3 shows a further exemplary embodiment of a state information system according to the invention.

It is also possible to provide sensors which record the measured variable reversibly and represent it by visible changes. These can be strain elements 31 which are arranged on a printing material web 30 according to FIG. 3. It can be seen that constrictions have been formed on the strain elements 31 on account of the tensile loading. A high-speed camera system 26.1 (see FIG. 2a) can be arranged on the machine in the web path, record the extent of the constriction and determine from the latter the tensile stress that is present.

In this way, other physical and/or chemical variables can also be recorded during the finishing of the printing material web and, as already described, can be incorporated directly into the open-loop and/or closed-loop control loop of a press.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. System for acquiring measured values of at least one of chemical and physical variables representing the state of a material during an operating process being carried out on the material, said system being arranged on or in the material as a part of the material so that the system is subjected to the operating process as part of the material, the system being arranged on or in the material such that the operating process remains unaffected by the system, the system comprising:
    at least one sensor which records at least one of a chemical variable and a physical variable during the operating process and generates signals.
2. A system as in claim 1 further comprising:
    at least one circuit for processing said signals; and
    a power supply for providing power for said at least one circuit.

3. A system as in claim 2 wherein said at least one circuit comprises an integrated circuit which conditions said signals to obtain measured values, and a memory for storing said measured values so that said measured values can be read out of said memory by means for reading said measured values.

4. A system as in claim 3 wherein said at least one circuit further comprises an integrated circuit which transmits said measured values, said means for reading the measured values comprising at least one receiver which receives said measured values transmitted by said integrated circuit.

5. A system as in claim 2 wherein said power supply comprises one of a battery and a chargeable capacitor.

6. A system as in claim 1 wherein said at least one sensor is at least one of strain gauges, temperature sensors, moisture sensors, and pH sensors.

7. A system as in claim 1 wherein said at least one sensor records said at least one of a chemical and a physical variable in a remanent manner, whereby at least one of minimum and maximum values of said variable can be evaluated.

8. A system as in claim 1 wherein said at least one sensor comprises a strain element which plastically deforms under tensile loading, whereby the tensile stress can be evaluated.

9. A system as in claim 1 wherein said at least one sensor comprises a sensor which records said measured value reversibly and so that said measured value can be evaluated visibly, said system further comprising a camera system which can read out said measured value recorded by said sensor.

10. A system as in claim 9 wherein said sensor which records said measured value reversibly is an elastically deformable strain element which constricts under tensile loading, whereby tensile stress can be determined from the extent of constriction read out by said camera system.

11. A system as in claim 9 wherein said sensor which records said measured value reversibly is a temperature sensor which indicates the temperature by means of color changes.

12. A system as in claim 1 wherein said material is a printing material web comprising paper, said system being at least partially embedded in said paper.

13. A system as in claim 1 wherein said material is a printing material web, said system being bonded to said web.

14. A system as in claim 1 wherein said system can be removed from said material for evaluation.

15. A system as in claim 1 further comprising at least one of a closed loop and an open loop control for a finishing process which is part of said operating process, said signals being incorporated directly into said control for said finishing process.

16. A system as in claim 1, wherein said material comprises a printing material web and said operating process is an operation of a web-fed printing press.

17. A system as in claim 1, wherein said system is encoded with information indicating a position of the system on said printing material web.

* * * * *